US006965766B1

(12) United States Patent
Saigo

(10) Patent No.: US 6,965,766 B1
(45) Date of Patent: Nov. 15, 2005

(54) MOBILE COMMUNICATION TERMINAL

(75) Inventor: Takaaki Saigo, Funabashi (JP)

(73) Assignee: Kabushiki Kaisha Kenwood, Tokyo (JP)

( * ) Notice: Subject to any disclaimer, the term of this patent is extended or adjusted under 35 U.S.C. 154(b) by 483 days.

(21) Appl. No.: 10/089,684

(22) PCT Filed: Sep. 14, 2000

(86) PCT No.: PCT/JP00/06320

§ 371 (c)(1),
(2), (4) Date: Apr. 3, 2002

(87) PCT Pub. No.: WO01/25888

PCT Pub. Date: Apr. 12, 2001

(30) Foreign Application Priority Data

Oct. 5, 1999 (JP) ................................. 11/284766

(51) Int. Cl.[7] .............................................. H04Q 7/20
(52) U.S. Cl. .................. 455/412.1; 455/403; 455/407; 455/466
(58) Field of Search ............................ 455/466, 412.1, 455/412.2, 413.1, 414.2, 403, 407, 158.1, 455/158.5, 497

(56) References Cited

U.S. PATENT DOCUMENTS

| 5,673,256 | A | * | 9/1997 | Maine ........................ 370/271 |
| 5,815,142 | A | | 9/1998 | Allard et al. |
| 5,850,594 | A | * | 12/1998 | Cannon et al. ............ 340/7.21 |
| 5,940,741 | A | * | 8/1999 | Briancon et al. .......... 340/7.22 |
| 6,115,611 | A | * | 9/2000 | Kimoto et al. ............ 455/456.3 |
| 6,151,507 | A | * | 11/2000 | Laiho et al. ................ 455/466 |
| 6,535,749 | B1 | * | 3/2003 | Iwata et al. ............... 455/556.2 |
| 2002/0065108 | A1 | * | 5/2002 | Tsukamoto .................. 455/564 |
| 2004/0067779 | A1 | * | 4/2004 | Kameyama .................. 455/566 |

FOREIGN PATENT DOCUMENTS

| JP | 10-334017 A | 12/1998 |
| JP | 11-161584 | 6/1999 |
| JP | 11-161584 A | 6/1999 |
| JP | 11-238025 A | 8/1999 |
| WO | WO 99/48265 | 9/1999 |

OTHER PUBLICATIONS

Supplementary European Search Report dated Mar. 23, 2005 for EP 00961030.4.
Official Action dated Nov. 5, 2003, Japanese Patent Office, Written Notification of Reason of Refusal, JP 284766/1999.
Official Action dated Apr. 8, 2004, Japanese Patent Office, Examiners Refusal Decision, JP 284766/1999.
International Search Report dated Dec. 19, 2000.

* cited by examiner

Primary Examiner—CongVan Tran
(74) Attorney, Agent, or Firm—Eric J. Robinson; Robinson Intellectual Property Law Office, P.C.

(57) ABSTRACT

A mobile communication terminal for registering information, e.g. an e-mail address or a telephone number obtained in the form of characters correctly and easily, as it is or after correcting part of such information, in a telephone directory. Two character strings corresponding to the address of the party to be called or the party with which information is communicated are present in the contents of a received mail. One character string represents a telephone number (03-000-0000 on the third line) and the other character string represents an e-mail address (aaa @ bcd.ef.jp on the fifth line). A character string representative of these two addresses is retrieved, displayed on a display section and registered in a telephone directory by selecting the displayed address.

8 Claims, 4 Drawing Sheets

FIG. 5

DATA ON A CERTAIN INDIVIDUAL

| NAME DATA | SOMEONE |
|---|---|
| TELEPHONE NUMBER (1) | 01-2345-6789 |
| TELEPHONE NUMBER (2) | |
| E-MAIL ADDRESS (1) | someone@mail.co.jp |
| E-MAIL ADDRESS (2) | |

MOBILE COMMUNICATION TERMINAL

TECHNICAL FIELD

The present invention relates to a mobile communication terminal such as a portable telephone or a PHS terminal, and to be more specific, to the mobile communication terminal having a telephone directory function and a message sending and receiving function.

BACKGROUND ART

A recent mobile communication terminal having a message sending and receiving function is capable of performing e-mailing, telephoning information gathering with the other end and so on by specifying an e-mail address, a telephone number, a contents address and so on. In that case, it is also possible for the user to directly input the e-mail address, telephone number or contents address which is an address destination of the other end when creating the mail, making a telephone call or obtaining information from the contents.

In many cases, however, such a mobile communication terminal has a telephone directory function and an address book function so that, without directly inputting on transmission, it refers to the telephone directory and address book and transmits to that e-mail address, telephone number or contents address.

On actual scenes, however, there are the cases where a list of the e-mail address and telephone number is written in the body of the received mail, or a contact is written in the mail obtained from the contents. Accordingly, in the case of registering the telephone number, e-mail address and so on with the telephone directory, it is not always feasible to register them only from originator information or the information on the destination of the sending mail.

In such cases, so far, the means whereby the mail contents are once displayed and are copied by the user on paper and so on, which is further registered with the telephone directory and the address book.

According to the conventional registration method, however, there are the cases where an error occurs when copying the information such as the e-mail address, telephone number and so on from the mail contents or when inputting the information written on paper, and consequently the wrong e-mail address and telephone number are registered. Furthermore, the procedure is complicated and inconvenient.

An objective of the present invention is to provide mobile communication terminal capable of correctly and easily registering with the telephone directory the information such as the e-mail address and telephone number obtained as textual information as-is.

Another objective of the present invention is to provide the mobile communication terminal capable of easily performing modification and registration even in the case of partially modifying and registering with the telephone directory the information such as the e-mail address and telephone number obtained as textual information.

DISCLOSURE OF THE INVENTION

To attain the above objective, the present invention provides a mobile communication terminal having detecting means for detecting a character string representing an address from text data of message contents displayed on a display portion, displaying means for displaying on the display portion the address represented by the character string detected by the detecting means, operating means for, of the addresses displayed on the display portion, selecting the address to be registered with storing means, and registering means for registering with the storing means the address selected by the operating means.

Moreover, the present invention provides the mobile communication terminal wherein in the case that a plurality of character strings representing the addresses are detected from the text data of message contents, the displaying means lists the plurality of addresses individually represented by the character strings to display them on the display portion.

Furthermore, the present invention provides the mobile communication terminal which allows the addresses to be registered with storing means by the registering means to be edited prior to the registration.

Furthermore, the present invention provides the mobile communication terminal which allows allowing the addresses to be registered by the registering means to be registered by adding them to the contents already registered with storing means.

Furthermore, the present invention provides a mobile communication terminal wherein when there is a certain symbol, alphanumeric character or the like in the detected character string, changing a pre-registration screen by the registering means.

Preferably, the address of the present invention includes any one or ones of a telephone number, an e-mail address and a home page address.

BRIEF DESCRIPTION OF THE DRAWINGS

FIG. 5 is a diagram showing a data structure as an example in the embodiment of the present invention.

BEST MODE FOR CARRYING OUT THE INVENTION

Figure 1:
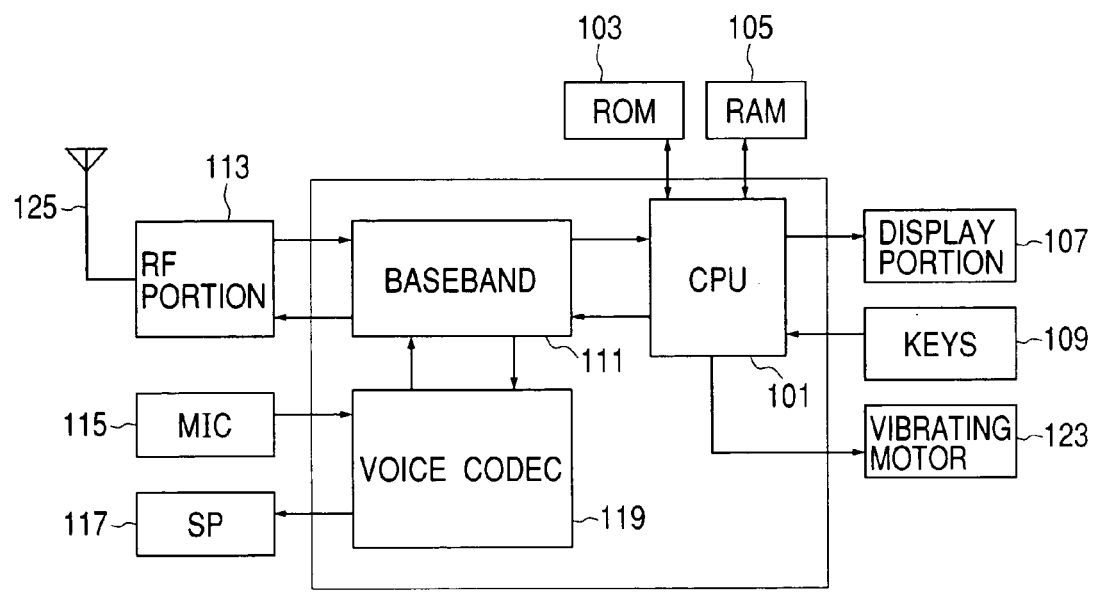
FIG. 1 is a functional block diagram of a mobile communication terminal.
Figure 2:
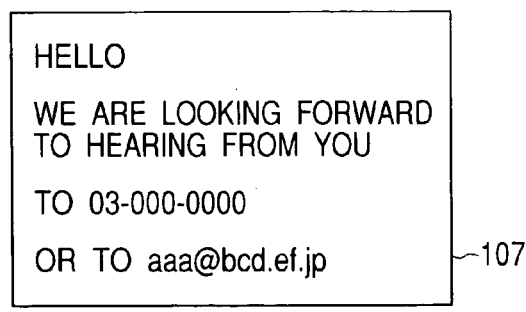
FIG. 2 is a diagram representing an example of the body of a message receiving history.
Figure 3:
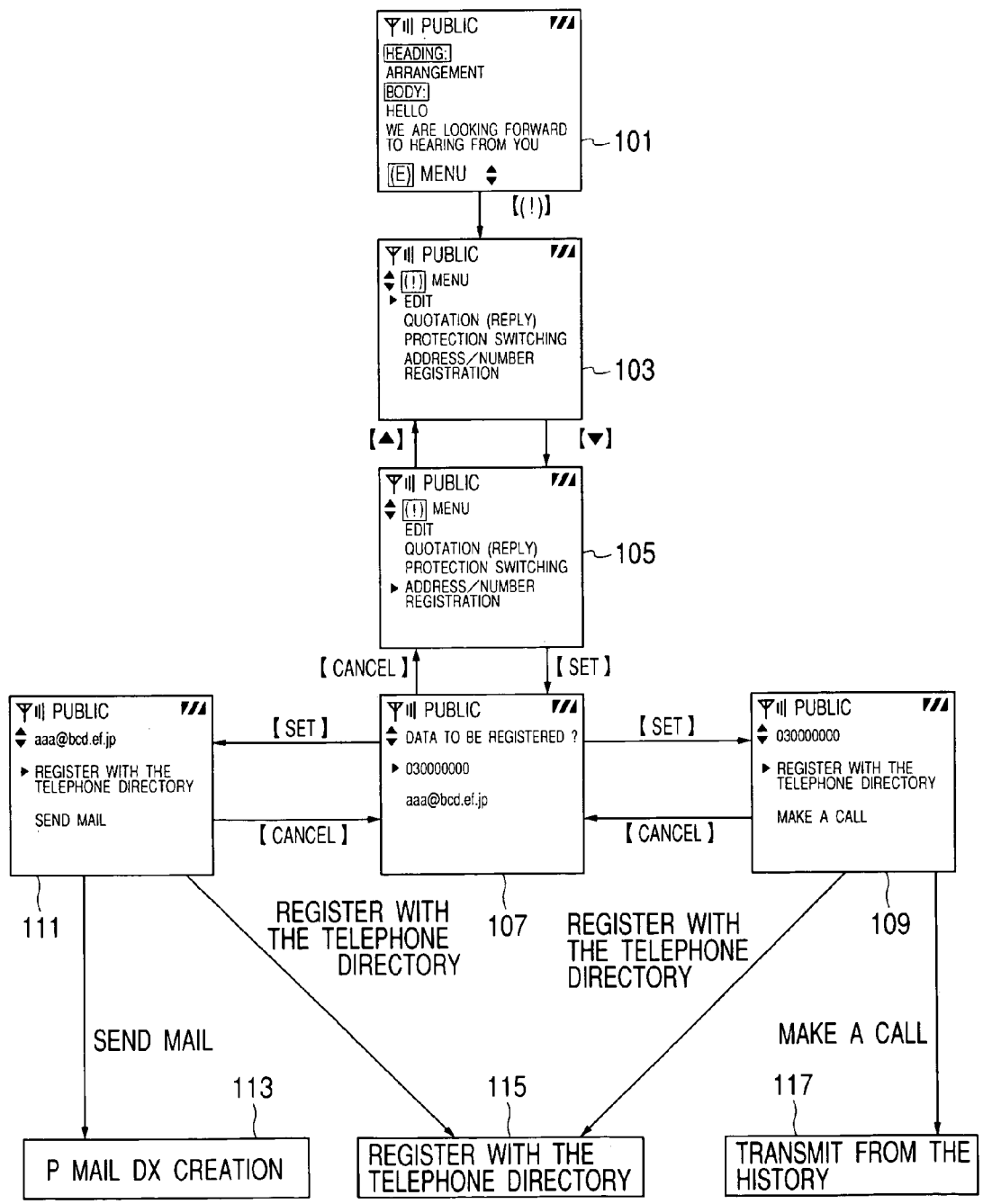
FIGS. 3 and 4 are diagrams showing a processing sequence when registering telephone directory data in an embodiment of the present invention.
Figure 4:
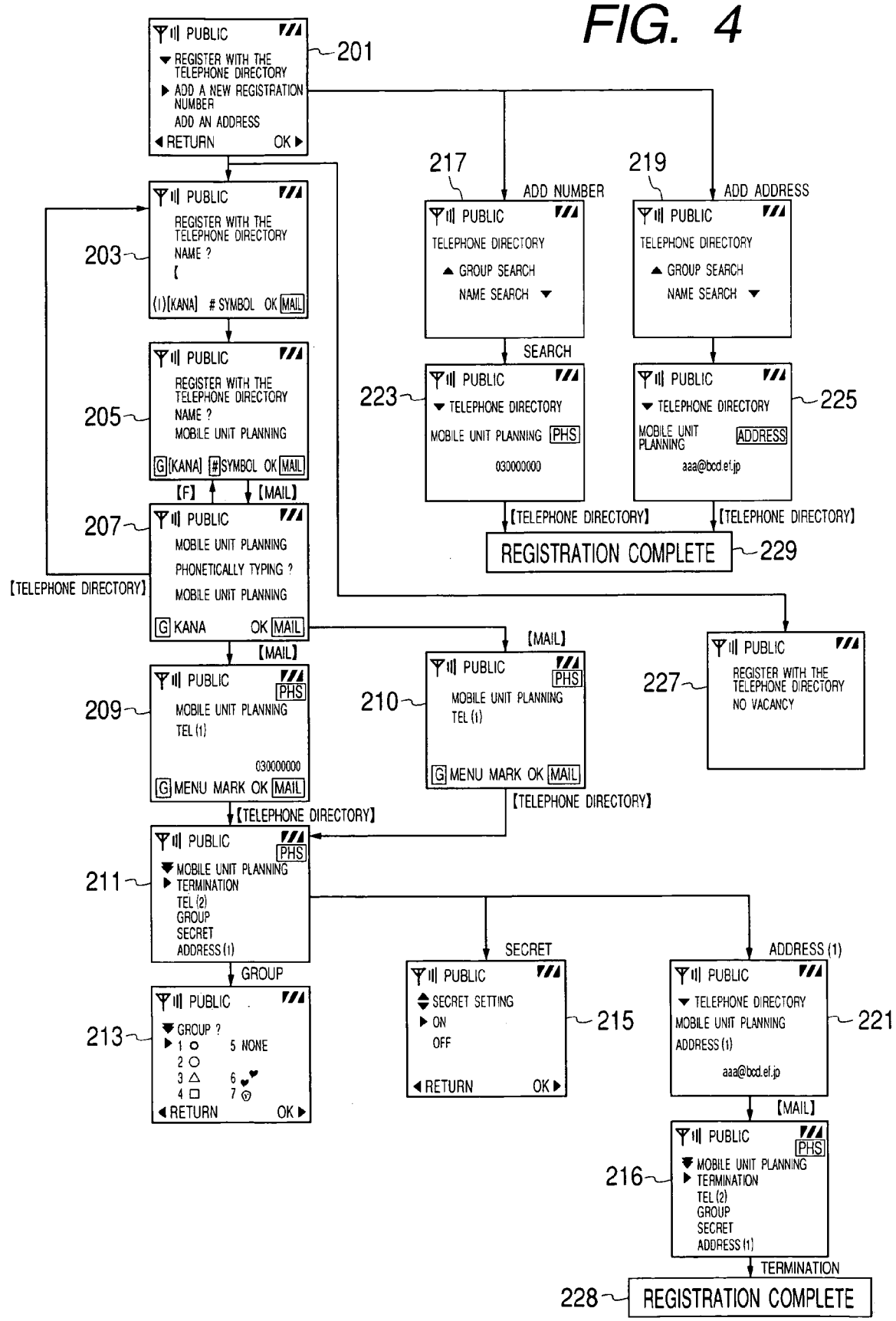

Next, an embodiment of a mobile communication terminal of the present invention will be described in detail by referring to FIGS. 1 to 4. FIG. 1 is a functional block diagram of a mobile communication terminal according to the present invention, and FIG. 2 is a diagram representing an example of the body of a message receiving history. FIGS. 3 and 4 are processing flowcharts showing a processing sequence when registering telephone directory data in the embodiment of the present invention together with display examples displayed on an LCD.

Moreover, an expression of "address information" is used in the following description as the information for specifying a telephone number, an e-mail address and a home page address.

As shown in FIG. 1, a portable mobile communication terminal according to the present invention has a CPU 101, a ROM 103, a RAM 105, an external memory 121, a baseband 111, an RF portion 113 and an antenna 125 and besides, a sound codec 119, an MIC (microphone) 115, an SP (speaker) 117, a display portion 107, keys 109 and a vibrating motor 123. The CPU 101 controls the entire portable mobile communication terminal.

The RF portion 113 sends a sound signal, a data signal (including text data) or a control signal and so on from the antenna 125, or receives the sound signal, data signal or control signal and so on from the antenna 125. And sending and receiving signals are modulated and demodulated by the baseband portion 111, and A/D conversion (analog to digital conversion) and D/A conversion (digital to analog conversion) are performed by the voice codec 119.

In addition, the MIC 115 is corresponding to a voice inputting portion, and the SP 117 is corresponding to a voice outputting portion. The display portion 107 displays functions and setting items which the main unit has in addition to the information provided to the main unit. The keys 109 is comprised of dial buttons for inputting the telephone number of a called party telephone, off-hook keys for calling or answering and so on or function keys for setting various functions. The vibrating motor 123 is a vibrating apparatus for notifying a user of reception by vibrating the telephone instead of notifying it by audible sound.

Moreover, the CPU 101 operates according to the control signals from the keys 109 and the baseband 111 in compliance with a program described in the ROM 103 so as to perform the functions of the main unit. In addition, system data such as terminal information is stored in the ROM 103. The CPU 101 is also connected to the RAM 105, and stores history data (a transmission and reception history and the text data sent and received) of the transmitted and received messages and the data registered or set by the telephone directory function and so on.

In the embodiment, the data is stored by associating it with the information for identifying a person. For instance, as in FIG. 5, a kind of a card type database is constituted, and a card having data fields of name data, telephone number 1, telephone number 2, e-mail address 1 and e-mail address 2 is assigned to an individual. There may be a state where there is only the information on the telephone number 1 with no information on the telephone number 2. In this case, when adding a new telephone number to certain individual information, it can be registered by adding it to the telephone number 2 for instance. In addition, it is possible to modify or delete a telephone number for any information field by a normally used method. These processes are performed likewise to the e-mail address in addition to the telephone number.

The text data shown in FIG. 2 is the one when the information on received mail is read from the RAM 105, and the contents of the received mail are displayed on the display portion 107 via the CPU 101 in compliance with the program stored in the ROM 103.

However, there are the cases where, depending on the size of the display portion 107, the full text of FIG. 2 is not displayed and the key, of the keys 109, is pressed to scroll and display it.

Here, in the contents of the received mail shown in FIG. 2, there are two character strings corresponding to the address of the called party or the party for sending or receiving the information. One of them is the telephone number (03-000-0000 on the line 3), and the other is the e-mail address (aaa@bcd.ef.jp on the line 5). According to the present invention, it is possible to easily register these two pieces of address information with the telephone directory by the user's operation. The operation of the processing sequence when registering with the telephone directory the address information included in the contents of the above received mail shown in FIG. 2 will be described by using FIGS. 3 and 4.

During display of the contents of a mail reception history (or a mail transmission history) in FIG. 3 (101), an operation menu of the telephone directory is displayed if the function [(!)] key is pressed (103). In the state where the operation menu is displayed, a [Π] key or a [→] key is pressed to move a cursor to the position of "address/number registration" of the menu items, and the address/number registration" is selected by a [SET] key (105).

The telephone number (03-000-0000) and the e-mail address (aaa@bcd.ef.jp) which were retrieved from the contents of the mail reception history are displayed on the display portion 107 (107). It is constituted so that, at this time, the CPU 101 extracts the character string having numbers, English letters, symbols and so on in a row as one block from the history contents. The [Π] key or [→] key is pressed to select the telephone number or the e-mail address to be registered with the telephone directory.

If a [CANCEL] key is pressed on a telephone number or e-mail address selection screen (107), it returns to the operation menu of the telephone directory (105). The telephone number or the e-mail address to be registered with the telephone directory is determined by the [SET] key. In the case where the telephone number is selected, it moves on to the screen (109) displaying the telephone number on the line 1, "Register with the telephone directory" on a line 2 and "Make a call" on the line 3. If the [Π] key or [→] key is pressed to select "Register with the telephone directory" (115), it moves on to a telephone directory registration screen (201) in FIG. 4. In addition, if "Make a call" is selected, it performs the same operation as transmission from the history (117). To return to the previous screen (107) during the selection, the [CANCEL] key is pressed.

On the other hand, in the case where the e-mail address is selected, it moves on to the screen (111) displaying the e-mail address on the line 1, "Register with the telephone directory" on the line 2 and "Send mail" on the line 3. It is constituted so that, at this time, the CPU 101 determines whether it is the e-mail address or the telephone number by a normally used identification method such as determining existence or nonexistence of @ in the character string having alphanumerics, symbols and so on in a row from the history contents so as to perform display control as desired. If the [Π] key or [→] key is pressed to select "Register with the telephone directory" (115), it moves on to a telephone directory registration screen (201) in FIG. 4. In addition, if "Send mail" is selected, it moves on to the screen for performing P mail DX creation (e-mail creation) (113). To return to the previous screen (107) during the selection, the [CANCEL] key is pressed.

On the telephone directory registration screen (201) in FIG. 4, the [Π] key or [→] key is pressed to select one of "New registration" on the line 2, "Register a number" on the line 3 and "Add an address" on the line 4.

In the case where "New registration" is selected, it moves on to a name registration screen so that the name to be newly registered with the telephone directory can be entered (203). If there is no vacancy in the telephone directory at this time, it displays the message of "No vacancy" on the line 2 and returns to a stand-by state (227).

On the name entry screen, ten keys [1] to [0], a [Telephone directory] key, the function keys [F] and [(!)], the [Π] key and [→] key and so on are used to enter the name to be registered (kanji, hiragana, katakana, alphanumerics and symbols), where "Mobile Unit Planning" is entered in FIG. 4 (205).

When the entry of the name is finished, a [Mail] key is pressed to move on to the screen for phonetically typing the name (half-size katakana, alphanumerics) (207). To return to the previous screen (205) during the phonetically typing, the [CANCEL] key is pressed. If the phonetically typed name is acceptable, the [Mail] key is pressed to move on to the screen (209) for entering a first telephone number.

Here, in the case where the telephone number is selected on the selection screen (107) in FIG. 3, the telephone number (03-000-0000) selected on the selection screen (107) in FIG. 3 is displayed under "TEL (1)" on the line 2 on the screen (209) for entering the first telephone number.

If the displayed telephone number (03-000-0000) is acceptable, it is confirmed by pressing the [Telephone directory] key to move on to an entry selection screen (211). If "Termination" on the line 3 is selected on the entry selection screen (211), the registration of the telephone number is completed. Moreover, in the case where unnecessary alphanumerics and so on are added to the displayed telephone number (03-000-0000), it is also possible to delete them by using the key 109 and then confirm and edit it.

On the other hand, in the case where the e-mail address is selected on the selection screen (107) in FIG. 3, nothing is displayed under "TEL (1)" of the line 2. The [Telephone directory] key is pressed in this state to move on to the entry selection screen (211), and an address (1) is selected, of the entry items, by pressing the [Π] key or [→] key.

On a first e-mail address entry screen (221) where it moves to, the e-mail address (aaa@bcd.ef.jp) selected on the selection screen (107) in FIG. 3 is displayed under "Address (1)" of the line 1 thereon. If the displayed e-mail address (aaa@bcd.ef.jp) is acceptable, it is confirmed by pressing the [Mail] key to move on to an entry selection screen (216). If "Termination" on the line 3 is selected on the entry selection screen (216), the registration is completed (228). Moreover, in the case where unnecessary alphanumerics and so on are added to the displayed e-mail address (aaa@bcd.ef.jp), it is also possible to delete them by using the key 109 and then confirm and edit it.

On the entry selection screen (211), there are entry selection items which can be moved on to a group setting screen (213) and a secret setting screen (215), apart from a TEL (2) (a second telephone number) and the Address (1) (the first e-mail address).

A group is a function capable of classifying registered users into predetermined groups. It is possible, by grouping the registered users, to perform an efficient search, change a ring tone or icon display for each group. Secret setting is a function of preventing the information on registered users from being seen by a third party, which requires a secret number in the case of displaying the registered user.

Next, the case where, on the telephone directory registration screen (201) in FIG. 4, "Add a number" on the line 3 or "Add an address" on the line 4 is selected will be described.

First, in the case where the telephone number (03-000-0000) is selected on the selection screen (107) in FIG. 3, "Add a number" on the line 3 on the telephone directory registration screen (201) in FIG. 4 is selected by pressing the [Π] key or [→] key.

Next, the screen (217) capable of selecting whether to perform a group search or a name search when searching for the registered user is displayed. In the case where it is registered in the name of "Mobile Unit Planning" as in the example in FIG. 4, it is possible to perform the name search for that name.

As the telephone number to be added under "Mobile Unit Planning," the telephone number (03-000-0000) selected on the selection screen (107) in FIG. 3 is displayed (223). If the [Telephone directory] key is pressed in this state, it is registered in the vacancy of either TEL (1) or TEL (2) (229).

On the other hand, in the case where the e-mail address (aaa@bcd.ef.jp) is selected on the selection screen (107) in FIG. 3, "Add an address" on the line 4 on the telephone directory registration screen (201) in FIG. 4 is selected by pressing the [Π] key or [→] key.

Next, a screen (219) capable of selecting whether to perform the group search or the name search when searching for the registered user is displayed. In the case where it is registered in the name of "Mobile Unit Planning" as in the example in FIG. 4, it is possible to perform the name search for that name.

As the e-mail address to be added under "Mobile Unit Planning," the e-mail address (aaa@bcd.ef.jp) selected on the selection screen (107) in FIG. 3 is displayed (225). If the [Telephone directory] key is pressed in this state, it is registered in the vacancy of either the Address (1) or Address (2) (229).

While the embodiment of the portable communication terminal according to the present invention was described in detail above, the present invention is not limited to the aforementioned embodiment but is changeable as far as it does not deviate from the general description thereof.

For instance, while the aforementioned embodiment was described by taking the telephone directory of the mobile communication terminal as an example, it is applicable to the cases where a target of the registration is an address book, a bookmark book or an address entry field when creating new mail.

In addition, while only the telephone number and the e-mail address were described as the address information in the embodiment, it functions likewise to arbitrary address information such as a home page address (for instance, http://somewhere. co. jp) by adding a detection method used in a detection mechanism of the present invention. Such detection is performed by the normally used method.

Moreover, while the database was described as the card type database in the description, the mechanism for detecting and registering the address information from the contents of textual information according to the present invention functions in any data configuration.

Any of the above additions and changes is derived from a basic configuration wherein the address information is automatically detected and registered, which is a characteristic of the present invention.

INDUSTRIAL APPLICABILITY

Thus, it is possible, according to the present invention, to provide the mobile communication terminal capable of correctly and easily registering with the telephone directory the information such as the e-mail address and telephone number obtained as textual information as-is.

Furthermore, it is possible to provide the mobile communication terminal capable of easily performing modification and registration even in the case of partially modifying and registering with the telephone directory the information such as the e-mail address and telephone number obtained as textual information.

What is claimed is:

1. A mobile communication terminal comprising:
   message receiving means for receiving a message sent from a communication partner sending at least the message;
   storing means for storing a reception history of the messages received by said message receiving means;

displaying means for displaying the contents of the reception history of the messages stored by said storing means, retrieving means for retrieving address information from the contents of the reception history of the messages displayed on said displaying means, said address information being a non-regular format destination information which was arbitrarily written in an ordinary message sentence by said communication partner;

first displaying control means for, in the case that there are a plurality of pieces of address information retrieved by said retrieving means, causing said displaying means to display the retrieved address information in such a manner that the retrieved pieces of address information can be discriminated from one another;

selecting means for selecting specific address information from the address information caused to be displayed on said displaying means by said first display control means;

second display control means for deciding a type of the specific address information selected by said selecting means on the basis of a character string indicative of address information and for causing said displaying means to display an operational command corresponding to the selected address information and its decided type; and registering means for registering with a directory the address information caused to be displayed on said displaying means by said second display control means, in response to the operation of the displayed operational command.

2. The mobile communication terminal according to claim 1, further comprising editing means for editing said retrieved address information before registering said information.

3. The mobile communication terminal according to claims 1 or 2 wherein a method of registration is changed in accordance with the type of the address information retrieved by said retrieving means.

4. The mobile communication terminal according to any one of claims 1, 2 and 3 wherein personal information about the communication partner is registered with the directory in such a manner that the personal information is associated with the registered address information.

5. The mobile communication terminal according to claim 4, wherein said registering means has associating means for associating said retrieved address information with the personal information about the communication partner to register the associated information before registering said address information with the directory.

6. The mobile communication terminal according to claim 5, further comprising personal information searching means for searching the personal information about the communication partner.

7. The mobile communication terminal according to claim 5, further comprising personal information inputting means for newly inputting the personal information about the communication partner.

8. A signal control method for a mobile communication terminal, said method comprising the steps of:

receiving a message sent from a communication partner sending at least the message;

storing a reception history of the messages received in said message receiving step;

displaying the contents of the reception history of the messages stored in said storing step;

retrieving address information from the contents of the reception history of the messages displayed in said displaying step, said address information being a non-regular format destination information which was arbitrarily written in an ordinary message sentence by said communication partner;

controlling displaying step so as to display a plurality of pieces of address information retrieved in said retrieving step in such a manner that the retrieved pieces of address information can be discriminated from one another;

selecting specific address information from the address information caused to be displayed in said displaying step in said controlling step;

deciding a type of the specific address information selected in said selecting step on the basis of a character string indicative of address information and controlling said displaying step so as to display an operational command corresponding to the selected address information and its decided type; and registering with a directory the address information, whose type has been decided in said deciding and controlling step, in response to the operation of the displayed operational command.

* * * * *